Feb. 9, 1937.  L. S. TWOMEY  2,070,099

METHOD OF SEPARATING AND PURIFYING GASES

Filed May 9, 1934  3 Sheets-Sheet 1

LEE S. TWOMEY
INVENTOR

ATTORNEY

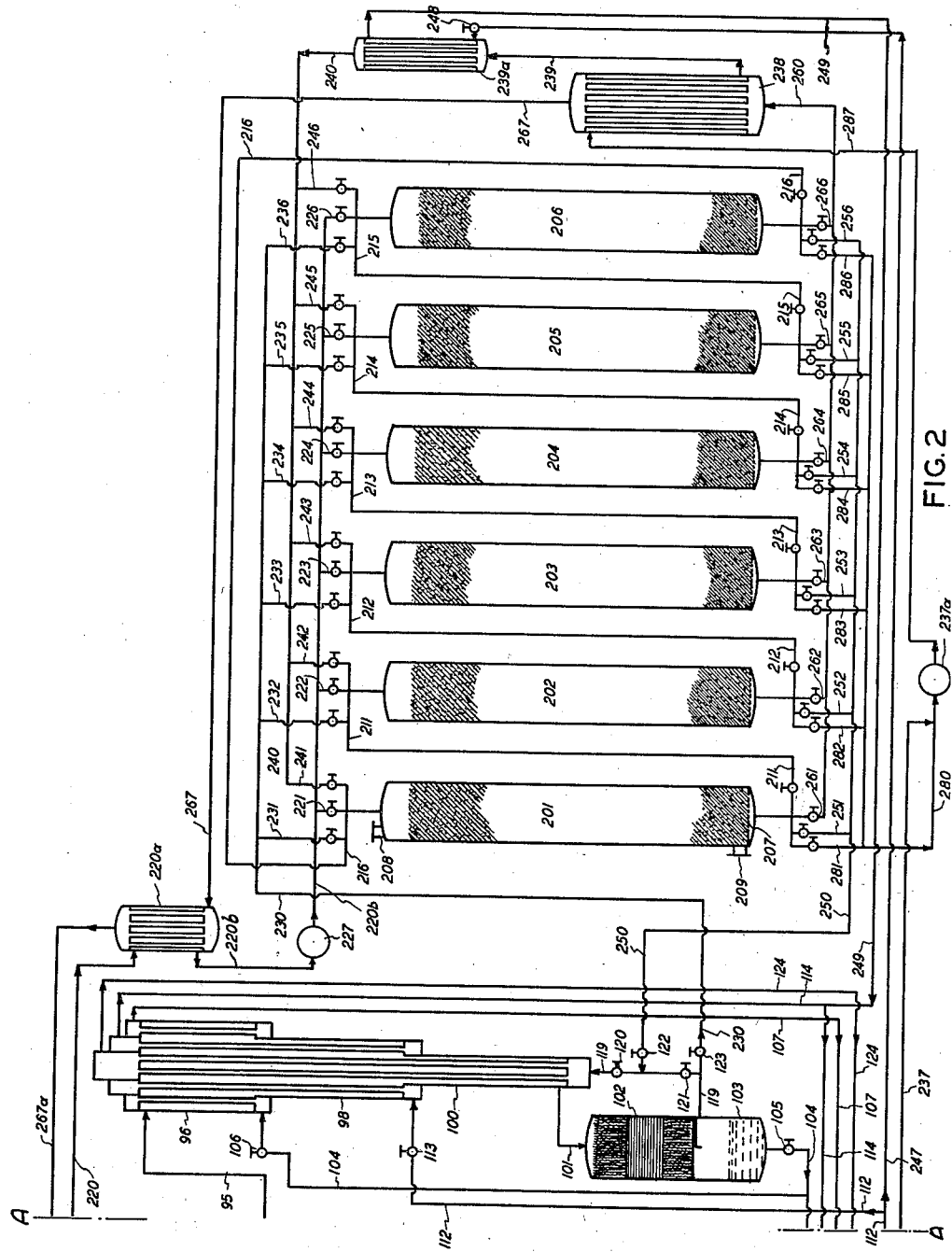

EFFECTS OF TEMPERATURE AND PRESSURE ON BLUE GAS FREED FROM CO₂ CONTAINING HYDROGEN 51.6% CARBON MONOXIDE 45.3% NITROGEN 3.1%

EFFECT PRODUCIBLE BY METHANE COOLING.

| COMPRESSION PRESSURE ON BLUE GAS. | PRESSURE ON EVAPORATING METHANE. | | | | |
|---|---|---|---|---|---|
| | 1.36 ATM. | 1.0 ATM. | 0.5 ATM. | 0.2 ATM. | |
| | TEMPERATURE OF EVAPORATING METHANE | | | | |
| | 116°K | 112°K | 104°K | 95°K | |
| | NITROGEN AND CARBON MONOXIDE IN PRODUCT HYDROGEN. | | | | |
| 10 ATM. | 3.1% | 3.1% | 3.1 | 3.4 | NITROGEN |
| | 45.3% | 45.3% | 45.3 | 36.0 | CARB. MON. |
| 20 ATM. | 3.1% | 3.1 | 3.5 | 4.3 | NITROGEN |
| | 45.3% | 45.3 | 35.0 | 18.0 | CARB. MON. |
| 30 ATM. | 3.1 | 3.3 | 4.0 | 4.7 | NITROGEN |
| | 45.3 | 40.0 | 23.3 | 12.0 | CARB. MON. |
| 40 ATM. | 3.5 | 3.7 | 4.3% | 4.8% | NITROGEN |
| | 37.5 | 30.0 | 17.4% | 9.0% | CARB. MON. |
| 50 ATM. | 3.7 | 3.9 | 4.5% | 5.0% | NITROGEN |
| | 30.0 | 25.0 | 14.0% | 7.2% | CARB. MON. |

EFFECT PRODUCIBLE BY NITROGEN COOLING.

| COMPRESSION PRESSURE ON BLUE GAS. | PRESSURE ON EVAPORATING METHANE | | | | |
|---|---|---|---|---|---|
| | 4 ATM. | 1.5 ATM. | 1.0 ATM. | 0.5 ATM. | 0.2 ATM. |
| | TEMPERATURE OF EVAPORATING METHANE | | | | |
| | 91°K | 81°K | 77°K | 72°K | 66°K |
| | NITROGEN AND CARBON MONOXIDE IN PRODUCT HYDROGEN |
| 10 ATM. | 3.9% | 4.8% | 5.0 | 5.0 | 2.0 | NITROGEN |
| | 26.0% | 10.0% | 7.0 | 3.0 | 1.2 | CARB. MON. |
| 20 ATM. | 4.6% | 5.2 | 5.3 | 2.5 | 1.0 | NITROGEN |
| | 13.0% | 5.0 | 3.5 | 1.5 | 0.6 | CARB. MON. |
| 30 ATM. | 4.9 | 5.0 | 3.3 | 1.7 | 0.7 | NITROGEN |
| | 8.7 | 3.3 | 2.3 | 1.0 | 0.4 | CARB. MON. |
| 40 ATM. | 5.1 | 3.8 | 2.5 | 1.2 | 0.5 | NITROGEN |
| | 6.5 | 2.5 | 1.8 | 0.8% | 0.3% | CARB. MON. |
| 50 ATM. | 5.2 | 3.0 | 2.0 | 1.0% | 0.3% | NITROGEN |
| | 5.2 | 2.0 | 1.4 | 0.6% | 0.2% | CARB. MON. |

FIG.3

Patented Feb. 9, 1937

2,070,099

UNITED STATES PATENT OFFICE 2,070,099

METHOD OF SEPARATING AND PURIFYING GASES

Lee S. Twomey, Vista, Calif.

Application May 9, 1934, Serial No. 724,698

10 Claims. (Cl. 23—210)

The object of my invention is to provide means and a method for separating mixtures of gases into their constituents. The general method employed includes the old and well known step of cooling the gas to a temperature at which one or more of its constituents liquefies while at least one of the constituents remains gaseous, followed by a separation of the liquid from the gaseous product. With this method I have combined certain steps which materially reduce the amount of power required to produce the cooling effect, and other steps which increase the sharpness of the separation and permit a more complete separation of the condensable from the incondensable gases than has heretofore been possible.

While no restriction is placed on the use of the method and apparatus hereinafter disclosed, it is directed primarily to the purification of hydrogen and to the quantity production of commercially pure or of highly purified hydrogen from such mixtures as "blue" water gas, of which the following is a typical analysis:

|  | Percent |
|---|---|
| Hydrogen | 49 |
| Carbon monoxide | 43 |
| Carbon dioxide | 4 |
| Methane | 1 |
| Nitrogen | 3 |

The following description refers to the attached drawings which is a diagrammatic vertical section of a suitable form of apparatus for performing the method steps. In this description, for the purpose of illustration, the gas fed to the apparatus will be considered to be the blue gas above referred to.

Figs. 1 and 2 represent respectively the left and right halves of the complete apparatus, which may be seen as a whole by joining the two sheets on the line A—A.

Fig. 3 is a table indicating certain effects of temperature and pressure in changing the composition of the above blue gas.

Figure 1:
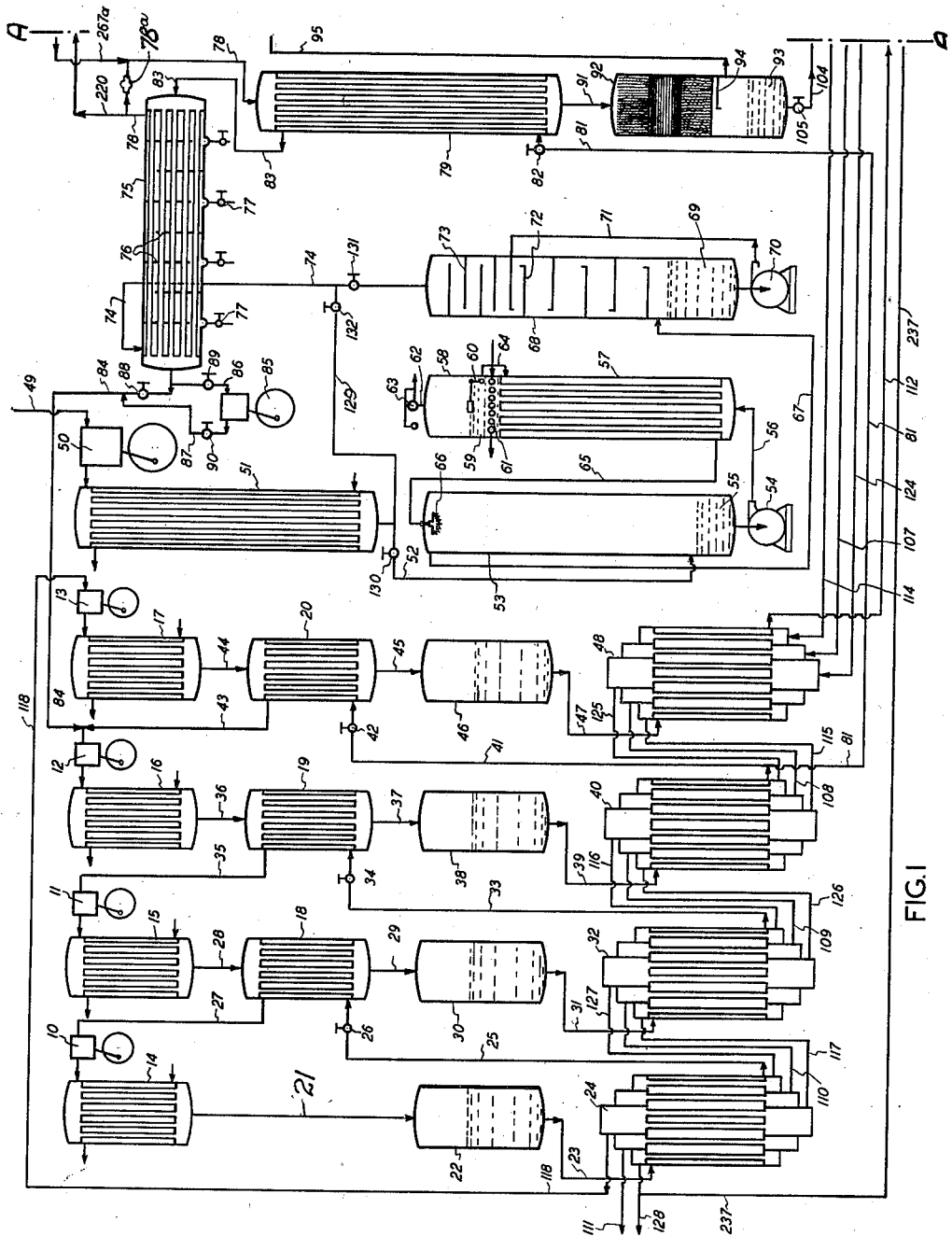

Referring to Figs. 1 and 2: 10, 11, 12, and 13 are compressors for ammonia, ethylene, methane, and nitrogen respectively. These compressors deliver their respective compressed gases into means for removing the heat of compression and returning the several gases to atmospheric temperature. Such means are illustrated at 14, 15, 16, and 17 as tubular coolers having inlets and outlets for water flowing around the tubes, but any preferred form of atmospheric-temperature cooler may be used.

The ethylene, methane, and nitrogen coolers deliver the cooled compressed gases into secondary tubular units 18, 19, and 20 in which they are further cooled and condensed as will be described.

Gaseous anhydrous ammonia is raised by compressor 10 to a pressure of about 10 atmospheres absolute at which pressure it condenses in water cooler 14, the liquefied gas passing through pipe 21 into a receiver 22. From the receiver a stream of ammonia passes through pipe 23 to an interchanger 24 in which it is cooled to a temperature materially lower than that at which it condenses. From this interchanger the ammonia passes through pipe 25 to an expansion valve 26 by which it is admitted to the shell of condenser 18, which is maintained at substantially atmospheric pressure (say from 0# to 5# gauge). At this pressure the ammonia vaporizes in withdrawing heat from and condensing compressed ethylene flowing through the tubes, and the resultant ammonia gas returns through pipe 27 to the suction of compressor 10 at substantially atmospheric temperature and pressure, thus completing the ammonia cycle.

Assuming a cooling water temperature of 20° C. (293° K.) and a lag of 5° C. due to imperfect interchange, the liquid ammonia will collect in receiver 22 at 298° K., at which temperature its vapor pressure is 10 atm. absolute. On entering cooler 18 its temperature drops to its boiling point at the pressure carried, being 240° K. at 0# and 247° K. at 5# gauge.

Gaseous ethylene is raised by compressor 11 to a pressure of about 22 atm. absolute, is brought back to atmospheric temperature in cooler 15 and passed through pipe 28 into the tubes of cooler 18, where it is further cooled and is condensed by evaporating ammonia. The liquefied ethylene passes through pipe 29 into a receiver 30. From this receiver a stream of ethylene passes through pipe 31 to an interchanger 32 in which it is cooled to a temperature materially lower than that at which it condenses. From this interchanger the ethylene passes through pipe 33 to an expansion valve 34 by which it is admitted to the shell of condenser 19, which is maintained at substantially atmospheric pressure (say from 0# to 5# gauge). At this pressure the ethylene vaporizes in withdrawing heat from and condensing compressed methane flowing through the tubes, and the resultant ethylene gas returns through pipe 35 to the suction of compressor 11 at substantially atmospheric temperature and pressure, thus completing the ethylene cycle.

Making the same assumptions as before, the liquid ethylene will collect in receiver 30 at 245° to 252° K., at which temperatures its vapor pressure is from 20 to 24 atm. On entering condenser 19 its temperature drops to its boiling point at the pressure carried, being 168° K. at 0# and 173° K. at 5# gauge.

Gaseous methane is raised by compressor 12 to a pressure of about 28 atm. absolute, is brought back to atmospheric temperature in cooler 16 and passed through pipe 36 into the tubes of cooler 19, where it is further cooled and is condensed by evaporating ethylene. The liquefied methane passes through pipe 37 into a receiver 38. From this receiver a stream of methane passes through pipe 39 to an interchanger 40 in which it is cooled to a temperature materially lower than that at which it condenses. From this interchanger the methane passes through pipe 41 to an expansion valve 42 by which it is admitted to the shell of condenser 20, which is maintained at substantially atmospheric pressure (say from 0# to 5# gauge). At this pressure the methane vaporizes in withdrawing heat from and condensing compressed nitrogen flowing through the tubes, and the resultant methane gas returns through pipe 43 to the suction of compressor 12. This completes the direct methane cycle, but there is a secondary cycle in which methane is withdrawn from the receiver and returned to the compressor for the intermediate cooling of the blue gas, as will be described.

Making the same assumptions as before, the liquid methane will collect in receiver 38 at from 173° to 178° K. at which temperatures its vapor pressure is from 25 to 30 atm. On entering condenser 20 its temperature drops to its boiling point at the pressure carried, being 112° K. at 0# and 116° K. at 5# gauge.

Gaseous nitrogen is raised by compressor 13 to a pressure of about 25 atm. absolute, is brought back to atmospheric temperature in cooler 17 and passes through pipe 44 into the tubes of cooler 20 where it is further cooled and is condensed by evaporating methane. The liquefied nitrogen passes through pipe 45 into a receiver 46. From this receiver a stream of nitrogen passes through pipe 47 to an interchanger 48 in which it is cooled to a temperature materially lower than that at which it condenses. From this interchanger the liquid nitrogen is withdrawn for uses in other parts of the system, as will be described.

Making the same assumption as regards lag in interchange, nitrogen will collect in receiver 46 at from 117° to 121° K. at which temperatures its vapor pressure is from 22 to 27 atm.

Describing now the flow of blue gas (or other gas to be treated) through the apparatus: raw gas at atmospheric temperature and pressure enters the system through pipe 49 and is raised by compressor 50 to a pressure of, for example, 20 atm. absolute. The pressure at the ultimate point of pressure release may be of the order of 20 atm., the pressure at the compressor discharge being then 20 atm. plus pressure drop through the apparatus. As this pressure drop will vary with details of construction and with optional variations in operating method, the compressor pressure cannot be specified, and the release pressure of 20 atm. is a preference only and may be widely departed from.

The compressed gas passes through the tubes of a water cooler 51 in which the heat of compression is removed and the gas brought back to atmospheric temperature, and thence through pipe 52 into a means for removing any carbon dioxide which may be present, by solution in water and caustic alkali.

This means may be of any preferred form, but as illustrated it comprises a spray tower 53 through which the gas passes upwardly. A centrifugal pump 54 withdraws saturated water from a pool 55 collecting in the bottom of the tower and passes it through pipe 56 to the lower end of the tubes of an interchanger 57 in which it is counterflowed against returning hot water. Passing out of the tubes the warm water enters a gas separating space 58 in the top of the tower. In this space a pool of water 59 is maintained by a float controlled valve 60, the water being heated to a temperature of the order of 90° C. by any heating means, indicated as a steam heated pipe coil 61. The gas thus evolved escapes from the system through pipe 62 in which is placed a relief valve 63 sufficiently weighted to prevent the water from being blown out by the pressure of gas in the spray tower.

The heated water, freed from gas, passes through pipe 64 to the upper end of the shell of interchanger 53 and counterflows the cold saturated water from the spray tower, thus heating it as described and being itself cooled. From the lower end of the interchanger the cold water passes through pipe 65 to a rose nozzle 66 or other spraying means in the top of the spray tower, by which it is distributed through the upflowing column of compressed gas.

The scrubbed gas leaves the upper end of the tower through pipe 67 and passes to a medial point in a caustic tower 68. This tower is arranged to collect a pool of liquid 69 in its lower portion, the liquid being an aqueous solution of caustic soda or caustic potash. A stream of this liquid is continuously withdrawn by a pump 70 and returned through pipe 71 to flow over a succession of trays 72 or equivalent devices for exposing large areas of solution to contact with the gas, which enters beneath the lowermost tray. By this contact the gas is substantially freed from carbon dioxide and passes upwardly between a succession of mist extracting baffles 73 and through pipe 74 to a dehydrating interchanger 75. The above described device is adapted to the conservation of water, but any of the well known scrubbing arrangements may be used if preferred.

Interchanger 75 is of the well known horizontal type consisting of a bundle of tubes through which the cooling medium passes, these tubes being enclosed by a shell through which the warm gas passes. This shell is divided into a series of pockets by staggered baffles 76, by which the length of travel of the gas and its velocity over the tubes are increased, each pocket so formed being drained as required by means of a valve 77.

Cold gaseous methane is passed through the tubes of this interchanger, as will be described, to cool the gas below the freezing point of water, and this interchanger should be provided in duplicate and with appropriate diversion valves for withdrawing and thawing out a unit which becomes loaded with ice without interrupting the operation of the system.

The dehydrated blue gas leaves interchanger 75 through pipe 78 and flows downwardly through the tubes of a condenser 79. In this condenser the gas is cooled to such point that the carbon monoxide content is partly condensed. This cooling effect is produced by the evaporation of liquid methane which flows from interchanger 40 through pipe 81 to an expansion valve 82 and into the shell of condenser 79 which is maintained at substantially atmospheric pressure. At this pressure the liquid methane vaporizes in withdrawing heat from the dehydrated blue gas, thus causing the condensation of carbon monoxide. The resultant methane gas passes through pipe 83 to the tubes of dehydrating interchanger 75 and thence through pipe 84, at substantially atmospheric temperature and pressure, to the suction of compressor 12.

At 0# gauge pressure methane boils at 112° K., at 5# gauge at 116° K. With care in the design of condenser 79 the effluent gas may be cooled to within 2° C. of these temperatures, or from 114° K. to 118° K. At these temperatures the vapor pressures of carbon monoxide are 13 atm. and 17 atm. respectively, and at an operating pressure of 20 atm. no condensation of carbon monoxide would be produced unless the proportion of carbon monoxide in the gas entering the condenser exceeded 65% and 85% at 114° and 118° respectively. At higher compressions on the blue gas and at lower back pressures on the methane compressor the concentration of carbon monoxide in the gas delivered by condenser 79 would be as shown by the table in Fig. 3.

As it may under some conditions be undesirable to pass the entire condensing load to the final interchangers (96, 98, and 100) and may also be undesirable to largely increase the compression of the blue gas, I prefer in such cases to introduce a secondary exhauster into the course of pipe 84. Such exhauster is indicated at 85, a branch suction 86 and a branch discharge 87 being connected into pipe 84 on opposite sides of stop valve 88. Valves 89 and 90 provide for cutting out the exhauster when valve 88 is opened to connect methane compressor 12 direct to the dehydrating interchanger. The use of an auxiliary exhauster provides for any desired reduction in temperature of condenser 79 without operating compressor 12 at a diminished back pressure, it being assumed that the exhauster will discharge at a pressure equal to the desired suction pressure on methane compressor 12.

From condenser 79 the cooled blue gas, which may contain more or less condensate of carbon monoxide, passes through pipe 91 to a mist extractor 92 which may be of any preferred form. As illustrated, the upper portion of the shell is filled with layers composed of a large number of spaced strips of corrugated sheet metal having the corrugations normal to the direction of fluid flow. The strips are arranged with the corrugations of adjacent strips in register, and the strips are separated by thin spacers so as to afford long and very narrow sinuous passages for the gas, this arrangement being highly effective for the separation of the fine mist of condensate which forms on cooling the gas to the condensing point of carbon monoxide.

The liquid thus separated from the gas collects in a pool 93 in the bottom of the extractor while the gas is withdrawn from beneath a shield 94 and passes through pipe 95 to the upper end of the shell of an interchanger, the three sections of which are numbered 96, 98, and 100, in which shell it is successively counterflowed against a series of cooling fluids. In the upper section 96 the gas is cooled by the evaporation of liquid carbon monoxide, in the next section by the evaporation of liquid nitrogen, and in the lowermost section 100 by the expansion of compressed cold hydrogen. By this successive cooling it is reduced to a temperature approximating the freezing point of carbon monoxide or 66° K. at which temperature most of the carbon monoxide is already condensed and largely in the form of a mist suspended in the residual hydrogen.

This mist passes through pipe 101 to a second mist extractor 102, in which the liquid collects as a pool 103. The liquid carbon monoxide, together with some nitrogen which may condense with it, collects in pools 93 and 103 and is withdrawn through a branched pipe 104 provided with diversion valves 105—105 and an expansion valve 106 by which it is admitted to the lower tube chamber of interchanger section 96. This space being maintained at approximately atmospheric pressure, the mixed carbon monoxide-nitrogen liquid evaporates and is reduced to approximately its boiling point at 1 atm. absolute or 82° K., and the blue gas passes out of this interchanger at a temperature 1° or 2° C. higher.

From the upper tube chamber the gaseous carbon monoxide passes through pipe 107 to interchanger 48 where it is counterflowed against liquid nitrogen having an initial temperature of 117 to 121° K., then through pipe 108 and interchanger 40 against methane at 173 to 178° K., then through pipe 109 and interchanger 32 against ethylene at 245 to 252° K., and finally through pipe 110 and interchanger 24 against ammonia at 298° K., leaving the system through pipe 111 at substantially atmospheric temperature and pressure.

The lower tube chamber of the second interchanger section 98 is supplied with supercooled liquid nitrogen drawn from interchanger 48 through pipe 112 which is provided with an expansion valve 113. This space is maintained at a pressure which will vary with the cooling effect available from the expansion of the residual hydrogen in interchanger 100, this effect being variable with options as to the operation of further parts of the system. The minimum pressure in the tubes and tube spaces of interchanger 98 will ordinarily be of the order of 2/10 atm. absolute, at which nitrogen boils at 66° K., the freezing point of carbon monoxide, and it may be very much higher. The expanded gaseous nitrogen passes through pipe 114 to interchanger 48, through pipe 115 to interchanger 40, through pipe 116 to interchanger 32, through pipe 117 to interchanger 24, and back to the suction side of compressor 13 at subatmospheric pressure and at substantially atmospheric temperature.

The gas removed from extractor 102 passes through pipe 119 into the lower tube chamber of interchanger section 100 and enters this chamber in an expanded condition and consequently at a temperature below that at which it is freed from condensate in separator 102. This expansion may be produced at an expansion valve 120, valve 121 being open and valves 122 and 123 being closed, or it may be otherwise produced, as for example in an expansion engine doing external work. By interchange in unit 100 the final temperature of the blue gas entering separator 102 is reduced, and as it is the spirit of the present application to maintain this final temperature above the freezing point of carbon monoxide, or 66° K., the temperature of the compressed blue gas entering interchanger 100 is so controlled by varying the quantity and/or the expansion pressure on the nitrogen in interchanger 98 as to maintain in separator 102 the nearest possible approach to this minimum temperature, or such higher temperature as may be necessary or desirable in view of optional subsequent operations.

The hydrogen passing through the tubes of interchanger section 100 is withdrawn from the upper tube chamber and passes through pipe 124 to interchanger 48, through pipe 125 to interchanger 40, through pipe 126 to interchanger 32, through pipe 127 to interchanger 24, and is finally withdrawn from the system at substantially atmospheric temperature and pressure as the purified hydrogen product. The degree of purity will vary with certain options as to manipulation, not yet described.

Instead of taking the product hydrogen direct from the expansion step it may be submitted to contact with solid adsorbents by which the highest degree of purity is produced.

Describing first the absorbers, these are indicated in the drawings as vertical cylinders numbered 201, 202, 203, 204, 205, and 206 respectively. These cylinders are filled with a desired solid adsorbent, such for example as activated charcoal, this char resting on a screen or other support 207. These supports and appropriate filling and discharge manholes 208 and 209 are shown on one cylinder only, but all are equipped in the same manner.

The six (or other number of) absorbers are connected in series by pipes 211, 212, 213, 214, 215, and 216, each of these pipes being provided with a valve. Each of these pipes affords communication between the bottom of one absorber and the top of the next and it will be noted that pipe 216 connects the bottom of cylinder 206 with the top of 201, thus making the series cyclic.

A pipe 220 branched from pipe 78 conducts dehydrated blue gas to an interchanger 220a where it is warmed by counterflow against warm blue gas entering this interchanger through pipe 267. From 220a the blue gas, which is now warm, passes into a pipe 220b which is again branched at 221-226 inclusive to admit blue gas to the upper end of any one of the cylinders, each branch being provided with a valve of the same number. A rotary blower or other low head gas pump 227 may be placed in pipe 220b to urge the requisite gas supply to and through the absorber system.

A pipe 230 is branched from the cold hydrogen pipe 119 and is again branched at 231-236 inclusive to admit cold hydrogen to the upper end of any one of the cylinders, each branch being provided with a valve of the same number.

A pipe 237 is branched from the warm hydrogen outlet pipe 128 to the upper end of a tubular interchanger 238, in which the hydrogen is cooled by counterflow against a cold gas leaving the apparatus. A rotary blower or other low head gas pump 237a may be placed in pipe 237 to urge the requisite hydrogen supply through the absorber system. From this interchanger a pipe 239 leads to an interchanger 239a in which the hydrogen is further cooled by the evaporation of liquid nitrogen. A pipe 240 connected to this interchanger is branched at 241-246 inclusive to admit cold hydrogen to any one of the cylinders, each branch having a valve of the same number.

A pipe 247 branched from pipe 112 conducts liquid nitrogen to an expansion valve 248 by which it is admitted to the shell of interchanger 239a, which is maintained at such pressure as to permit the nitrogen to evaporate at or below the operating temperature of the absorbers. The expanded nitrogen returns through pipe 249 to a junction with pipe 114 and thence flows through interchangers 48, 40, 32, and 24 to the suction of nitrogen compressor 13 as already described.

A pipe 250 is branched from hydrogen pipe 119 at a point between valves 120 and 121, and is again branched at 251-256 inclusive to permit treated hydrogen to be returned from the lower end of any one of the cylinders to hydrogen interchanger 100, each branch having a valve of the same number.

A pipe 260 leading into the lower end of interchanger 238 is branched at 261-266 inclusive to permit cold blue gas to be withdrawn from the lower end of any one of the cylinders to counterflow warm hydrogen, each branch having a valve of the same number. From the upper end of this interchanger a pipe 267 returns warm blue gas to interchanger 220a where it is cooled by counterflow against dehydrated blue gas as described. From this interchanger a pipe 267a conducts the blue gas to a junction with pipe 78 on the downstream side of a check-valve 78a.

A pipe 280 is branched at 281-286 inclusive to permit warm pure hydrogen to be withdrawn from the lower end of any one of the cylinders. Pipe 280 is connected at its opposite end into the suction of blower 237a.

It is well known that when a mixture of gases or vapors having different liquefying temperatures at any given pressure, is contacted with certain solid adsorbents, the more readily condensible constituent is selectively adsorbed by the solid and may thus be partially or completely removed from the less condensible. It is also well known that the adsorption of the more readily condensible mater and its retention in the adsorbent solid is facilitated to some extent by increase in pressure and, usually to a greater extent, by decrease in temperature, and that the adsorbed matter may be removed from the solid adsorbent by heating it to a temperature materially above the boiling points of the adsorbed matter at the existing pressure.

This is commercial practice in the separation of liquid hydrocarbons from natural gas by passing the gas, usually at substantially atmospheric temperature and pressure, through columns of adsorbent charcoal and intermittently removing the absorbed liquids from the char by heating it with direct steam.

In the present invention I have applied these well known principles to the purification of a gas (as for example hydrogen) from gases having higher boiling points (as for example nitrogen and carbon monoxide) by the provision of means for cooling the mixed gases to very low temperatures, of means for removing the absorbed impurities from the charcoal, of means for precooling the absorbers and of means for regenerating the extremely low temperatures employed without losing any of the cooling effect residing in the cold intermediate or final products. By these means the known theories of selective adsorption are made available for the commercial purification and separation of the so-called "fixed" gases at reasonable costs, an end not heretofore attained.

Before describing the operation of the absorber unit it should be predicated that the operation is essentially intermittent and that each cylinder is used successively in three operative stages, the starting point of the operation passing from one cylinder to the next in order as represented in the drawings.

The three stages of the operation are as follows: first, absorption, in which clean, precooled charcoal is contacted with a flow of the gas to be purified, this stage terminating when the charcoal has become saturated with impurities; second, the cleaning of the charcoal, herein termed "heating", in which the saturated charcoal is heated to such temperature that the impurities are gasified and driven off; third, precooling, in which the clean char and its container are brought back to the temperature of the gas flow and thus fitted for reuse in the first stage.

For reasons which will appear, it is preferable to utilize at least two cylinders in series in each of these stages, and in the following description we will assume that cylinders 201 and 202 are in the first or absorbing stage, cylinders 203 and 204 are in the third or precooling stage, and cylinders 205 and 206 are in the second or heating stage.

It will be understood that in the description following the three stages of absorption, heating, and cooling occur simultaneously in three pairs of absorbers, and that at the termination of each stage the one absorber in each pair in which the stage is completed is ready to be moved up to the beginning of the succeeding stage.

Starting from separator 102, in which a continuous supply of cold hydrogen containing more or less carbon monoxide and nitrogen is available, and closing valve 121 to prevent this hydrogen from passing to interchanger 100, we open valve 123 allowing the hydrogen to pass under pressure through pipe 230 to open valve 231 and thus into the top of cylinder 201. In this cylinder the nitrogen and carbon monoxide are at least partially absorbed from the hydrogen, which passes through pipe and valve 211 to the top of absorber 202, in which any impurity escaping from 201 is absorbed. The completely purified gas leaves the lower end of absorber 202 through valve and pipe 252 and returns through pipe 250 and open valve 122 to expansion valve 120, by which it is admitted to interchanger 100.

In this description the absorption is conducted under the pressure and at the temperature at which the hydrogen enters separator 102. It is possible to completely open valve 120 and utilize valve 123 as the expansion valve, in which case the absorption is conducted at atmospheric pressure. This produces a lower temperature in the absorber than that available from heat transfer in interchanger 100, and permits the use of absorbers designed for low pressure.

The absorption stage may be continued until traces of impurities begin to show at the outlet of absorber 202 or come to some predetermined proportion.

At the end of the absorption period, the stream of hydrogen from pipe 230 is diverted from absorber 201 to absorber 202, valve 212 is opened to place absorber 203 (which in the meantime has been cleaned and chilled) in series with 202, and the fouled absorber 201 is transferred to the heating stage of a succeeding cycle, as will be described. Simultaneously with absorption in 201 and 202, previously fouled absorbers 205 and 206 are being heated.

Starting from pipe 78, in which a supply of dehydrated blue gas at a temperature somewhat below atmospheric, a stream of this gas is drawn through pipe 220 and an interchanger 220a by a blower 27 and is delivered through pipe 220b and through pipe and valve 225 into absorber 205, which is the last but one of the absorbers to come out of the previous absorbing stage. In this interchanger the gas is heated to atmospheric temperature. From the bottom of 205 the blue gas is directed through pipe and valve 215 to the top of absorber 206, which is the last absorber to come out of the previous absorbing stage. In 206 the blue gas begins the heating of the char and becomes heavily loaded with impurities removed from it. In 205 the warm blue gas completes the heating of the char and the removal of the impurities from it. The foul blue gas from absorber 206, which is now at the minimum temperature, passes through pipe and valve 266 and pipe 260 to interchanger 238 where it is used to cool the hydrogen used in the precooling stage, and returns at substantially atmospheric temperature and pressure through pipe 267 to interchanger 220a, from which it passes through pipe 267a to a junction with pipe 78, downstream from the junction of pipe 220 with pipe 78.

The heating stage terminates when absorber 205 is brought to atmospheric temperature at its lower end, at which time it is clean and ready for precooling. At this time the stream of blue gas is diverted into absorber 206 and passes thence through pipe and valve 216 to the top of absorber 201, which in the meantime has become completely fouled and ready for cleaning. Simultaneously with absorption in 201 and 202 and with heating in 205 and 206, previously cleaned absorbers 203 and 204 are being brought back to cold gas temperature.

Starting from pipe 128, in which a supply of purified hydrogen at atmospheric temperature is constantly available, a stream of this gas is drawn through pipe 237 by blower 237a and directed into interchanger 238, where it is cooled by counterflow against foul blue gas as above described. As perfect interchange cannot be realized in practice and as heat is constantly leaking into the system, the stream of hydrogen leaving this interchanger may be slightly above the (predetermined) minimum temperature, and in this case it is passed through pipe 239 into interchanger 239a where it is further cooled by the evaporation of liquid nitrogen.

Passing then through pipe 240 it is admitted through pipe and valve 243 to the top of absorber 203, which is the last but one to come out of the previous heating stage. From the bottom of 203 the hydrogen passes through pipe and valve 213 to the top of absorber 204, which is the last to come out of the previous heating stage. In 204 the hydrogen begins the chilling of the char and is brought back to atmospheric temperature. In 203 the cold hydrogen completes the precooling of the char to the minimum temperature and prepares it to be put back into the absorbing stage. The warm hydrogen (which will not be appreciably contaminated if the free gas remaining in the heated absorber is blown out into pipe 260 before admitting the hydrogen to its proper return pipe) is returned through pipe and valve 284 and pipe 280 to the suction of blower 237a to be again cycled through the chilling stage, the cycle in effect floating on the pure hydrogen outlet pipe 128 through pipe 237.

The precooling stage terminates when absorber 203 is brought to the minimum temperature at its lower end, at which time it is clean and cold and ready to be put back into absorption service. At this time the stream of cold hydrogen is diverted into absorber 204 and passes thence through pipe and valve 214 to the top of absorber 205, which in the meantime has been completely cleaned and is ready for chilling.

When the three stages are (more or less simultaneously) completed, the sequence is moved one step to the right. That is to say, cylinder 201, which is now completely charged with impurities, becomes the second cylinder in the heating stage, cylinder 203, which is now completely cooled, becomes the second cylinder in the absorbing stage, and cylinder 205, which is now completely heated and cleaned, becomes the second cylinder in the cooling stage. To effect these changes the following valve manipulations are made:

Divert cold untreated hydrogen from 201 to 202 by closing valve 231 and opening valve 232.

Divert the series flow of hydrogen being absorbed by closing valve 211 and opening valve 212.

Divert the pure hydrogen outlet from 202 to 203 by closing 252 and opening 253.

Divert the chilling gas from 202 to 203 by closing valve 243 and opening valve 244.

Divert the series flow of chilling gas by closing 213 and opening 214.

Divert the chilling gas outlet from 204 to 205 by closing 284 and opening 285.

Divert the heating gas from 205 to 206 by closing 225 and opening 226.

Divert the series flow of heating blue gas by closing 215 and opening 216.

Divert the outlet of cold blue gas from 206 to 201 by closing valve 266 and opening valve 261.

It will be evident that to effect the described interchange in element 238 the operations of heating and precooling must occupy the same time period. As the amounts of heat to be transferred are substantially the same in each direction and cover the same temperature range, and as the rate of gas flow through the two operations is independently controllable, this synchronization offers no operating difficulty. The actual time required for heating or cooling is ordinarily only a small part of the time required to exhaust the absorbing effect of a cylinder, and it is immaterial whether or not the heating and cooling operations be lengthened to occupy the entire absorption period, by retarding the flow rate of the heat transferring media.

By using at least two cylinders in series in the absorbing stage a more complete utilization of the capacity of the char is effected than is possible with a single cylinder. As the char progresses toward saturation its adsorption rate is progressively lowered and it is impossible to completely utilize the adsorptive value of a single body of char without very greatly lowering the flow rate of the gas being treated. The second absorber, containing fresh char, effectively removes all impurities passing from the first cylinder as it approaches saturation, and permits the utilization of the entire adsorptive value of the first char body without retardation of the gas flow rate.

The desirability of using at least two cylinders in series in the heating and precooling stages is based on somewhat different grounds. The existing conditions—direct contact of gas with the char, relatively high heat conductivity of the char and absence of convection in the interstices of a pack of granular solids—are ideal for rapid heat interchange in either direction between the solid and the gas. For this reason the heating or cooling effect takes place, not through the entire length of the cylinder at once, but in a zone of relatively small depth which progresses through the cylinder in the direction of gas flow. For example, in a cylinder which has been heating for say half the time required for completion, the upper portion of the body of char is completely heated to atmospheric (the maximum) temperature, the lower portion is at its original (the minimum) temperature, and an intermediate zone is in progress of heating, at the maximum temperature on its upper side and at the minimum temperature below.

The depth of this zone will vary with the conductivity of the char, the velocity of the heating (or cooling) gas, the extent to which channeling occurs and other variables. It will be evident that, no matter what its depth, a single cylinder will discharge a gas of rising or falling temperature during the time required for this zone to travel through the cylinder for a distance equal to its depth: i. e., the time required for the zone to pass out of the cylinder. It is equally evident that if the depth of this zone does not exceed the depth of the second absorber, the zone of changing temperature may be moved to such position in this second unit that the gas issuing from the first will be at one extreme of the temperature range while that issuing from the second is at the other extreme, thus providing for the complete heating or cooling of the first body of char without discharging any gas of intermediate temperature such as would interfere with interchange between the heating and cooling gases and thus prevent the complete recovery of the cooling effect resident in the cold heating gas.

The results producible with the apparatus above described are variable with the manner in which it is manipulated, this being optional in many features.

If the original gas be low in carbon dioxide content, it is permissible to omit either or both the scrubbing steps described in connection with elements 53, 57, and 68 (the spray tower and caustic tower) and to divert the compressed and water-cooled blue gas from the lower end of water cooler 51 into dehydrating interchanger 75. For this purpose a pipe 129 is provided as a crossover from pipe 52 to pipe 74 and in making the diversion, valves 130 and 131 are closed and valve 132 is opened.

If the temperature at the blue gas outlet of dehydrating interchanger 75 be held above 216° K., the freezing point of carbon dioxide, any quantity of this constituent which may be found in the original gas will pass on to the methane interchanger 79, the outlet temperature of which is 114° to 118° K. At this temperature the carbon dioxide is frozen and its vapor pressure is negligible (materially below 1/1000 atm.). If proper provision be made for high gas velocity through the tubes of this interchanger, the frozen carbon dioxide will in large part be carried forward into mist extractor 92 from which it may be removed by heating at intervals varying with the carbon dioxide content of the raw gas.

As another option, the nitrogen cooling stage may be omitted. When operating in this manner, the methane interchanger 79 is maintained at a pressure of say 0.2 atm. absolute, at which methane boils at 95° K. and an outlet temperature of about 98° K. may be obtained. At this temperature the vapor pressure of carbon monoxide is 4.8 atm. absolute and a gas containing more than 9.6% of carbon monoxide would liquefy all excess over that quantity. The excess would have to be considerable to provide for the functioning of the next step, the reduction of the temperature of the gas to the boiling point of liquid carbon monoxide in interchanger 96. Assuming that the cooling effect of the expanded hydrogen would at least offset the lag in carbon monoxide interchange, the temperature of the gas entering separator 102 is 82° K. at which the vapor pressure of carbon monoxide is 1 atm. absolute and the proportion of carbon monoxide in the effluent gas at 20 atm. pressure is 5.0%.

This degree of fractionation is obviously of no value when considered as a means of purifying hydrogen, and as carbon monoxide has no present value other than as a fuel, this step alone would be without purpose. Under some conditions, however, it might be desirable in connection with the absorption step, as while the load thrown on the absorbers would be many times increased (in the ratio of 0.11 at 66° K. to 1.0 at 82° K.), this step is relatively inexpensive as regards power consumption and maintenance and it might well be more economical to operate under an increased absorber load and a much decreased load on the refrigeration cycles.

In the above description extended reference is made to a method for heating the saturated absorbers to drive out the absorbed impurities and for returning these vessels to the lower temperature desired for absorption. It will be understood that when the absorption is conducted under super-atmospheric pressure, a mere release of the pressure will drive out a portion of the impurities, the proportion thus regasified varying with the extent of the pressure reduction. This restores only part of the absorbing capacity but, particularly when absorbing at high pressure, may in some cases be more economical than heating and chilling.

As shown in Fig. 3, the purity of the hydrogen produced by refrigeration will vary both with the pressure to which the gas is compressed and the temperature to which it is cooled.

In this method, in which a point slightly above the freezing point of carbon monoxide, is taken as the lower limit of temperature, any purification beyond the limits given in the table (a hydrogen purity of 98.4% at 20 atm. of 99.5% at 50 atm., etc.) must be produced by the adsorption step or by further increase in pressure and in many cases it will be found economical to hold a low pressure, as of the order of 10 to 20 atmospheres, and pass a less pure hydrogen to the absorbers, than to attain the last degree of purification in the refrigeration stage of the process.

I claim as my invention:

1. In an operation involving the absorption of impurities from a gas at low subatmospheric temperature by passage of said gas through precooled bodies of solid absorbent materials, the method of precooling said bodies which comprises: passing a stream of a gas initially at said low temperature through a plurality of initially warmer bodies in series, whereby said bodies are progressively cooled and said stream is warmed; withdrawing the first body of said series when said body has attained approximately the initial temperature of said cold gas stream, and adding a further warm body to said series at the discharge end thereof before the discharge temperature of said stream falls materially below the initial temperature of said warm bodies.

2. In an operation involving the absorption of impurities from a gas by passage of said gas through bodies of solid absorbent materials at low subatmospheric temperatures, the method of heating said cold bodies and removing absorbed impurities therefrom which comprises: passing a stream of a warm gas through a plurality of said cold bodies in series, whereby said bodies are progressively warmed and said stream is cooled; withdrawing the first body from said series when said first body has attained a desired higher temperature, and adding a further cold body to said series at the discharge end thereof before the discharge temperature of said stream rises materially above the initial temperature of said cold bodies.

3. In an operation involving partial purification of a gas stream by condensation of a portion of the impurities originally existing therein and a final purification of said stream by absorption of residual impurities in a body of solid absorbent material, the method of revivifying an impurity-saturated body of said solid material which comprises: diverting from said gas stream prior to said partial purification a stream of said unpurified gas; passing said diverted stream through said saturated body at an initial temperature higher than that of said body, whereby said body is heated and impurities are transferred from said solid material to said diverted stream, and returning said diverted stream together with said impurities to first said gas stream to pass through said condensation step.

4. In a method involving the production of a stream of water-free impure hydrogen and the final purification of said stream by absorption of residual impurities therefrom in a body of solid absorbent material, whereby said body becomes saturated with said impurities, the method of revivifying said saturated body which comprises: diverting from said stream a stream of water-free impure hydrogen; passing said diverted stream through said saturated body at an initial temperature higher than that of said body, whereby said body is heated and impurities are transferred from said solid material to said diverted stream, and returning said diverted stream together with said impurities to first said stream.

5. The method of regenerating bodies of solid absorbent material saturated with impurities withdrawn from an unpurified gas in producing a purified gas, which comprises: heating one of said saturated bodies and removing said impurities therefrom by passing through said saturated body, in direct contact with said solid material, a heated stream of said unpurified gas, whereby said unpurified stream is cooled; cooling another of said bodies which has previously been subjected to said heating step by passing through said heated body a cooled stream of said purified gas, whereby said purified stream is heated, and effecting heat interchange between said cooled unpurified stream and said heated purified stream whereby said cooled unpurified stream is heated and said heated purified stream is cooled.

6. The method of regenerating bodies of solid absorbent material saturated with impurities withdrawn from an unpurified water-free gas in producing a purified water-free gas, which comprises: heating one of said saturated bodies and removing said impurities by passing through said saturated body, in direct contact with said solid material, a heated stream of said unpurified water-free gas, whereby said unpurified stream is cooled; cooling another of said bodies which has previously been subjected to said heating step by passing through said heated body a cooled stream of said water-free purified gas, whereby said purified stream is heated, and effecting heat interchange between said cooled unpurified stream and said heated purified stream whereby said cooled unpurified stream is heated and said heated purified stream is cooled.

7. The method of regenerating bodies of solid absorbent material saturated at low subatmospheric temperature with impurities withdrawn from unpurified hydrogen in producing purified hydrogen, which comprises: heating one of said saturated bodies and removing said impurities therefrom by passing through said saturated body, in direct contact with said solid material, a first stream of hydrogen initially heated to substantially atmospheric temperature, whereby said first stream is cooled to said low temperature; cooling another of said bodies which had previously been subjected to said heating step by passing through said heated body a second stream of hydrogen initially cooled to said low temperature, whereby said second stream is heated to substantially atmospheric temperature, and effecting heat interchange between said cooled first stream and said heated second stream whereby said cooled first stream is returned to substantially atmospheric temperature and said second heated stream is materially cooled.

8. The method of regenerating bodies of solid absorbent material saturated at low subatmospheric temperature with impurities withdrawn from unpurified hydrogen in producing purified hydrogen, which comprises: heating one of said saturated bodies and removing said impurities therefrom by passing through said saturated body, in direct contact with said solid material, a stream of said unpurified hydrogen initially heated to substantially atmospheric temperature, whereby said unpurified stream is cooled to said low temperature; cooling another of said bodies which had previously been subjected to said heating step by passing through said heated body a stream of said purified hydrogen initially cooled to said low temperature, whereby said purified stream is heated to substantially atmospheric temperature, and effecting heat interchange between said cooled unpurified stream and said heated purified stream whereby said cooled unpurified stream is returned to substantially atmospheric temperature and said heated purified stream is materially cooled.

9. The method of regenerating a cold body of solid absorbent material saturated with impurities withdrawn from an unpurified gas which comprises: rendering a stream of said unpurified gas water-free by freezing water contained therein, whereby said stream is chilled; heating said chilled stream; passing said heated stream through said body, whereby said body is heated and said stream is cooled; passing said cooled stream in heat interchange relation with a stream of warmer gas, whereby said stream is reheated, and producing first said heating effect by passing said reheated stream in heat interchange relation with said chilled stream.

10. In the simultaneous heating of a cold saturated body of solid absorbent material and cooling of a warm clean body of said material, the steps comprising: passing a first stream of initially warm gas through said cold body, whereby said cold body is warmed and said first stream is cooled; passing a second stream of initially cold gas through said warm body, whereby said warm body is cooled and said second stream is heated; passing said cooled first stream in heat interchange relation with said heated second stream, whereby said second stream is partially cooled, and completing the cooling of said second stream by the evaporation of a liquid refrigerant in heat interchange relation with said second stream.

LEE S. TWOMEY.